United States Patent [19]
Glover

[11] Patent Number: 5,121,972
[45] Date of Patent: Jun. 16, 1992

[54] DEVICE FOR COOLING VEHICLE BRAKE AREA

[76] Inventor: Gordon W. Glover, 1247 Ridge Rd., Pylesville, Md. 21132

[21] Appl. No.: 600,853

[22] Filed: Oct. 22, 1990

[51] Int. Cl.$^5$ .............................................. B60B 7/00
[52] U.S. Cl. ................................. 301/6 CS; 301/37 R; 188/264 W
[58] Field of Search ................. 301/6 R, 6 CS, 37 R, 301/37 N, 37 H; 188/264 R, 264 A, 264 AA, 264 W

[56] References Cited

U.S. PATENT DOCUMENTS

| | | | |
|---|---|---|---|
| 2,548,070 | 4/1951 | Ryan | 301/37 N |
| 2,707,131 | 4/1955 | Sundberg | 301/37 N |
| 2,762,469 | 9/1956 | Lyon | 301/6 CS X |
| 4,744,606 | 5/1988 | Yoshida | 301/6 CS |
| 4,901,826 | 2/1990 | Preiss | 301/6 CS X |

FOREIGN PATENT DOCUMENTS 3231364 3/1984 Fed. Rep. of Germany ... 301/6 CS

*Primary Examiner*—Russell D. Stormer
*Attorney, Agent, or Firm*—William F. Frank

[57] ABSTRACT

The present invention comprises a non-rotary cover assembly for the wheels of a vehicle mounted on fixed axles. The assembly is mounted on a shaft assembly connected to the spindle of the wheel. An adjustable bushing on the shaft assembly positions the cover assembly from the vehicle wheel in accordance with the width of the wheel rim from the wheel hub. The wheel cover assembly includes a plate which is connected to the vehicle wheel and carries a bearing assembly which allows rotation of the wheel without rotating the wheel cover of the assembly. The wheel cover has an opening on the forward facing surface of the cover to permit the flow of air into the underside of the cover and direct the air flow over the brake area and drum assembly of the vehicle during the forward movement of the vehicle. The present invention will also direct air toward the electric motors on vehicles of the future which will be powered by batteries in lieu of combustion engines. The present invention includes a second embodiment wherein the wheel cover consists of removable or replaceable air scoop portion and a mating air directing portion.

7 Claims, 9 Drawing Sheets

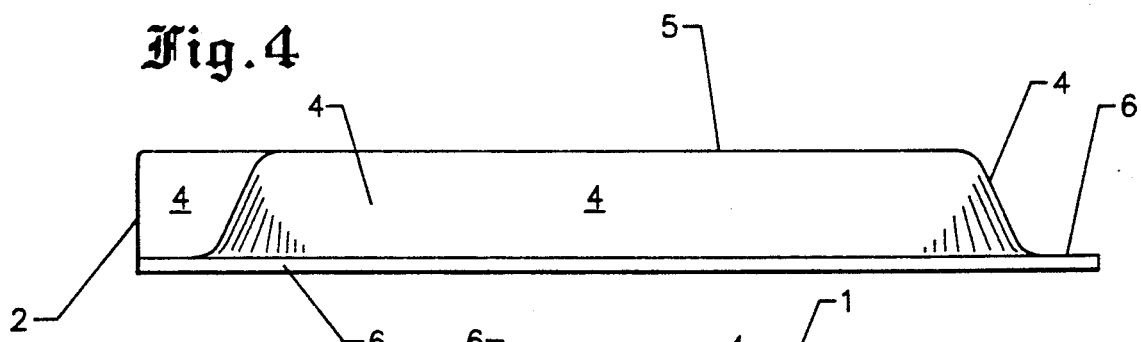
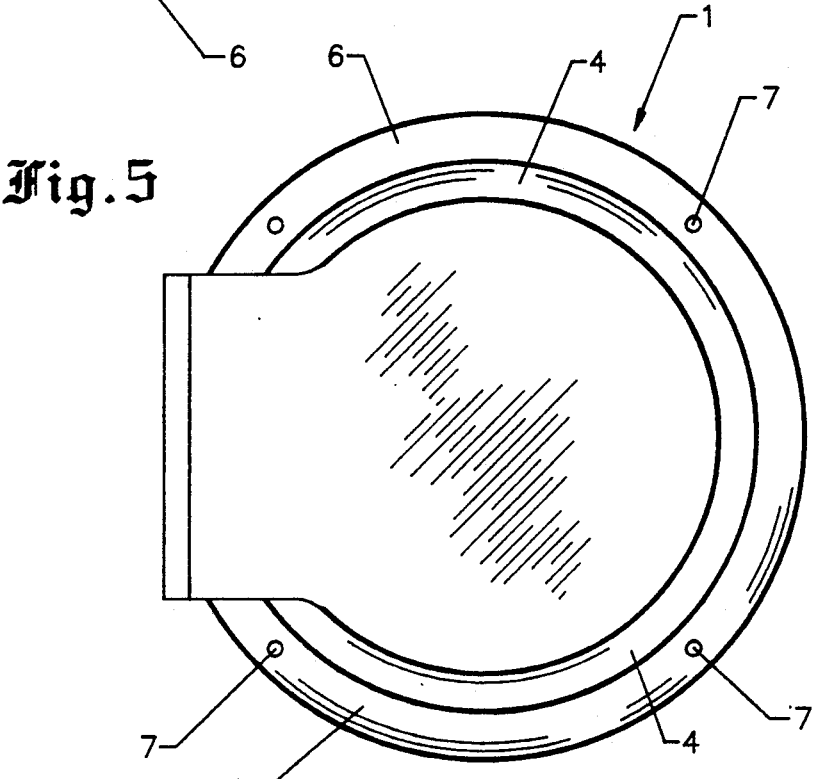
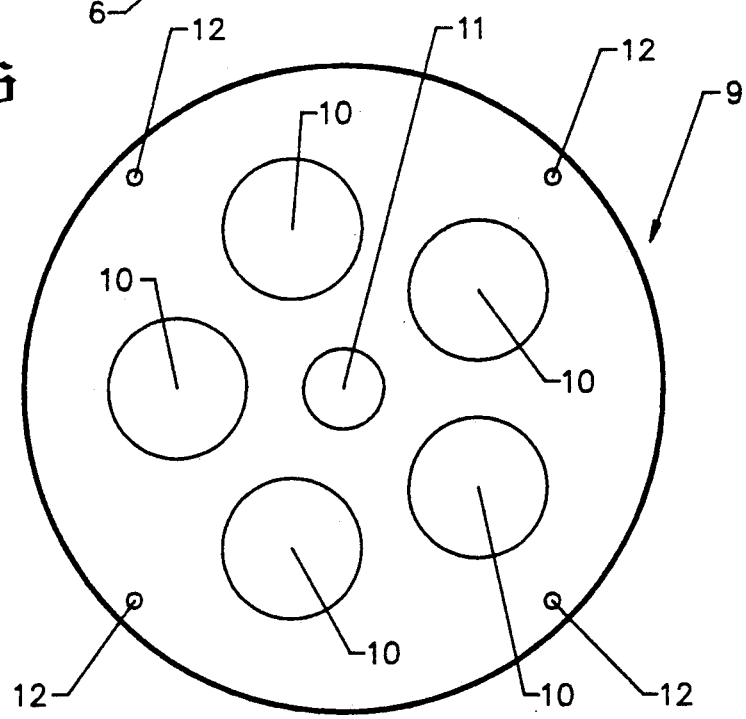

DEVICE FOR COOLING VEHICLE BRAKE AREA

FIELD OF INVENTION

The present invention is in the general field of vehicle wheels, more particularly, it is in the field of braking devices for vehicle wheels.

BACKGROUND OF THE INVENTION

Stopping the forward or rear movement of any land vehicle requires cessation of the rotation of the vehicle wheels. Early solutions utilized a strap encompassing a braking hub on the inner side of the wheel. The strap was in a mounting surrounding this hub and pressing a lever brought the strap into contact with the hub. At this stage of the development of motor powered vehicles, vehicle speeds were low, the wheels were large and composed of a plurality of spokes extending from a central hub to a circumferential ring. To deflect dirt, mud and water from spraying the vehicle outer surfaces, fenders were installed, generally covering only the width of the wheel with its tire. Engine compartments were relatively small and vehicle bodies were well spaced from the wheels. As a result there was always an unobstructed flow of air on both sides of a vehicle's wheels. While this was an advantage in dry weather, the presence of rain could be a disadvantage. The braking strap could become wetted as could the inner surface of the braking hub.

To overcome this problem, a new braking system was developed. Basically, it was the reversed position of the earlier braking system and comprised a pair of opposing arcuate braking segments having friction material on their outer surfaces mounted on a plate fixed to the axle housings of the vehicles and being mounted for outward radial movement in contrast to the constricting movement of the earlier braking band. The braking hub was increased in diameter to encompass the braking segments and thereby substantially reduce the contact by rain with the arcuate segments and the interior of the braking hub. The increased diameter of the braking hub reduced the length of the spokes in a wheel. Initially these spokes were of wood with attendant size for strength. Whether for aesthetic reasons or an unrecognized reasoning, the wooden spokes were replaced by an increased plurality of thin metal spokes. The wire spokes provided more openings around the outer surface of the braking drums. For aesthetic reasons and with more consideration of aerodynamics vehicle bodies began to shroud the wheel openings. The development of disc braking systems resulted primarily in reducing the width of the brake drums but not the diameters.

This development of the braking system does not indicate any consideration in the development design of the temperature increase in the braking drum. The only evident acknowledgement of this potential can be found in the tests made on braking efficiency. These tests are generally reported as "cold braking distances" and "hot braking distances". In all tests the "hot braking distance" is greater than the "cold braking distance".

The current design of vehicle wheels is a large metal central portion covering the interior of the wheel, the braking hub and the four or five circular openings between this central portion and the wheel rim, the openings being primarily to reduce weight. Wheel covers are increasingly becoming discs with only peripheral openings. The result is that the heat generated in tires and wheels during prolonged periods of movement of the vehicle is increasingly trapped within the wheel cover thus contributing to the difference in braking distances between "cold braking" and "hot braking".

Prior to the present invention there is no known attempt to decrease this distance between "cold braking" and "hot braking" by redesigned wheel covers.

SUMMARY OF THE PRESENT INVENTION

The present invention comprises a non-rotary cover assembly for the wheels of a vehicle mounted on fixed axles. The assembly is mounted on a shaft assembly connected to the spindle of the wheel. Adjustable means on the shaft assembly position the cover assembly from the vehicle wheel in accordance with the width of the wheel rim from the wheel hub. The wheel cover assembly includes a plate which is connected to the vehicle wheel and carries a bearing assembly which allows rotation of the wheel without rotating the wheel cover of the assembly. The wheel cover has an opening on the forward facing surface of the cover to permit the flow of air into the underside of the cover and direct the air flow over the brake area assembly of the vehicle during the forward movement of the vehicle. The present invention will also direct air toward the electric motors on vehicles of the future which will be powered by batteries in lieu of combustion engines. The present invention includes a second embodiment wherein the wheel cover consists of removable or replaceable air scoop portion and a mating air directing portion.

BRIEF DESCRIPTION OF THE DRAWINGS

The present invention will be shown in the illustrative embodiment in the accompanying drawings.

FIG. 4 is a rear elevation view of the present invention.

FIG. 5 is a bottom plan view of FIG. 1.

FIG. 6 is a top plan view of the adapter plate for mounting the present invention, the bottom plan view being substantially identical.

DETAILED DESCRIPTION OF THE INVENTION

Figure 1:
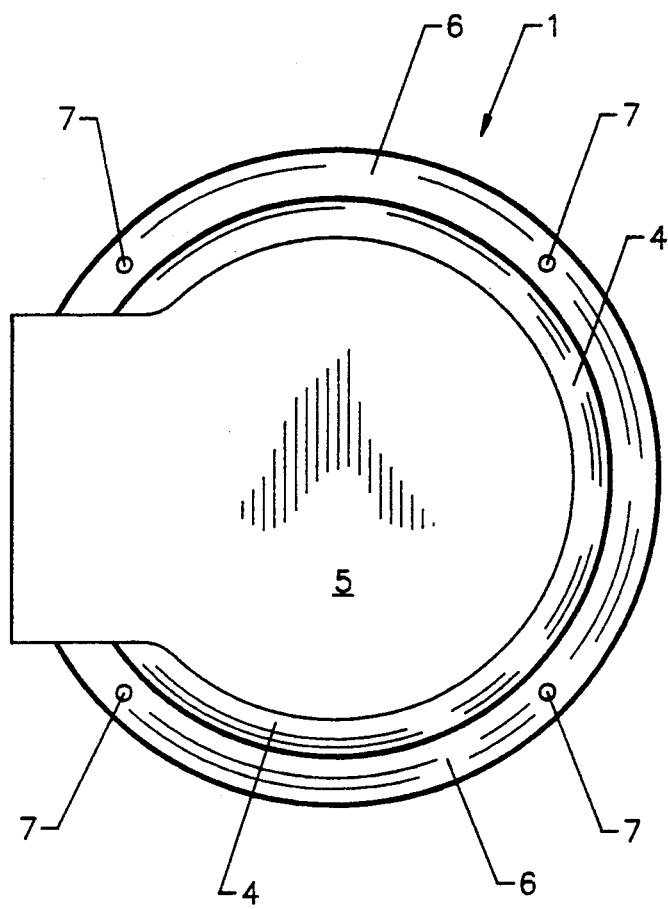
FIG. 1 is a top plan view of the present invention in the operating position.
Figure 2:
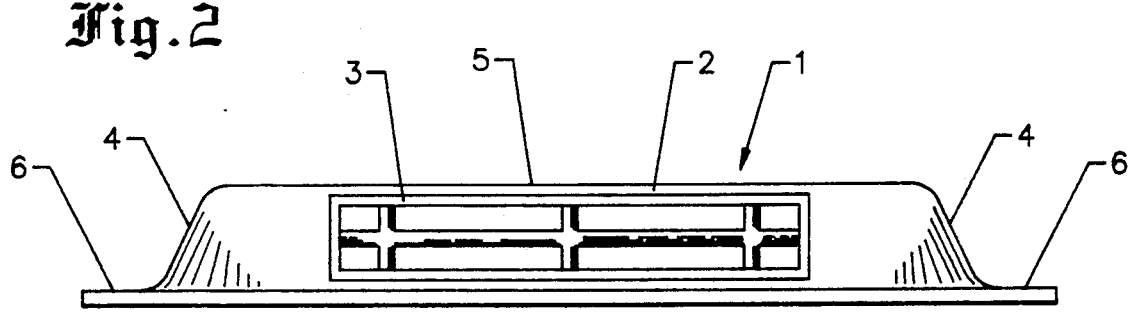
FIG. 2 is a left side elevation view of the present invention.
Figure 3:
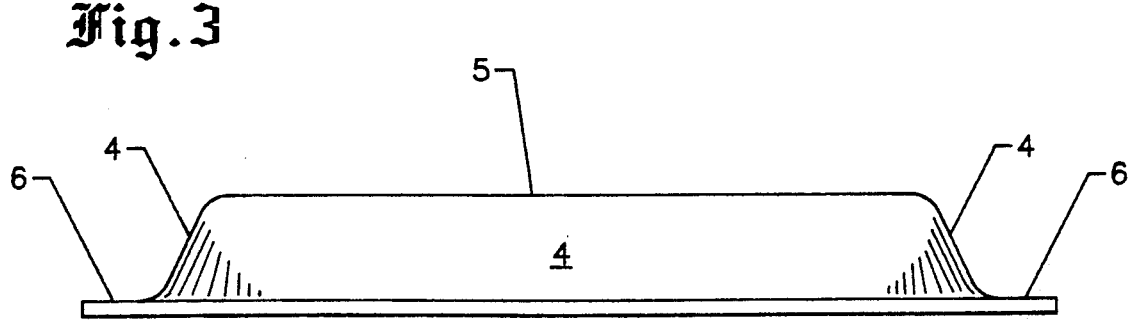
FIG. 3 is a right side elevation view of the present invention.
Figure 7:
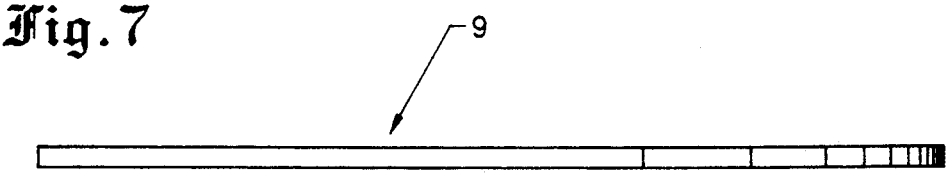
FIG. 7 is a front elevation view of the adapter plate seen in FIG. 6, the view from the rear being substantially identical.
Figure 8:
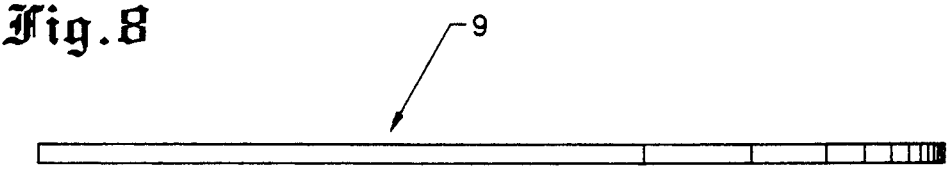
FIG. 8 is a right side elevation view of the adapter plate.
Figure 9:
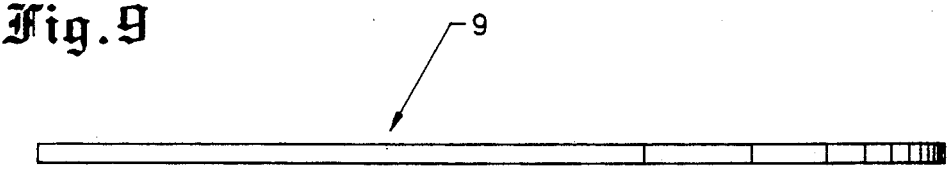
FIG. 9 is a left side elevation view of the adapter plate.

FIGS. 1-5 of the present invention show a wheel cover 1 adapted to receive elements to mount the cover on the vehicle wheel and the brake area of a vehicle, the cover remaining stationary during the rotation of the wheel. As seen in FIG. 1, the forward face 2 of the wheel cover 1 has a grill 3 which permits the passage of air therethrough as the vehicles moves. The vertical surface 4 of the cover and the top surface 5 shown in FIGS. 1-5 are devoid of any openings therein thus allowing free flow of the air entering the grill to be directed over the brake area. The cover 1 includes a mounting flange 6 with openings 7 to receive screws 8 for mounting the cover. The cover is made of a moldable shock-resistant thermoplastic material including carbon fibers which will resist the impact of any rocks or similar type objects which may be directed against the cover during the course of the operation. The wheel cover may also be made of a metallic material which can be easily formed into the configuration shown in the drawings.

Referring now to FIGS. 6-9, it will be seen now that the adapter plate 9 shown thereon has a circumference and configuration identical to that of the cover. The plate itself contains a plurality of openings 10 which permit the passage of air from the grill 3. There is a central opening 11 which fits over an adapter extension shaft of the present invention which will be described in more detail later. Adapter plate 9 contains a plurality of threaded openings 12 on its periphery which correspond to the openings 7 of the cover 1 and into which screws 8 are inserted when the cover 1 is to be secured to the adapter plate 9 when the latter has been properly positioned.

Figure 10:
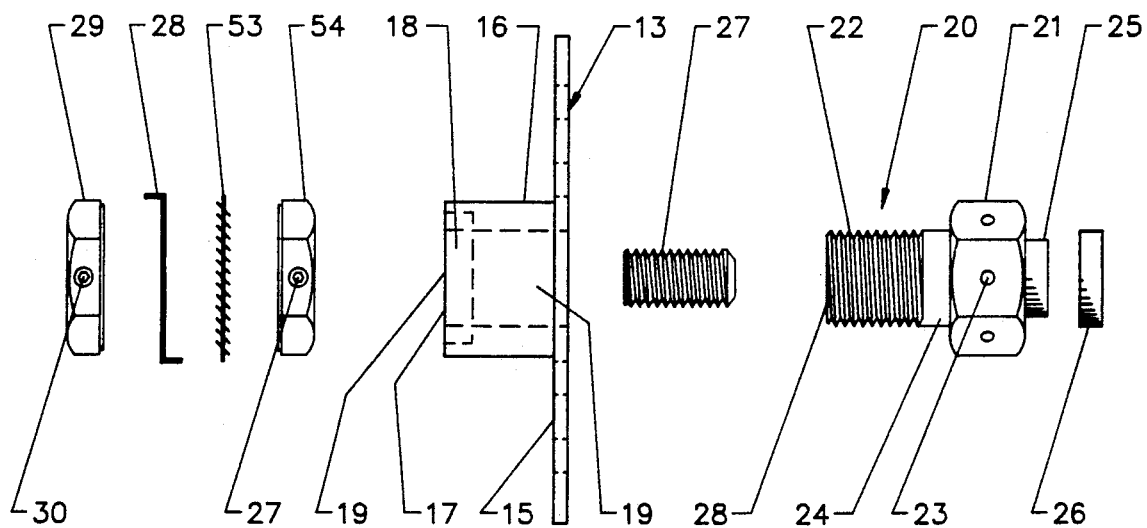
FIG. 10 is a side elevation view of accessory parts for mounting the cover on an axle, the view from all sides being mirror images.
Figure 11:
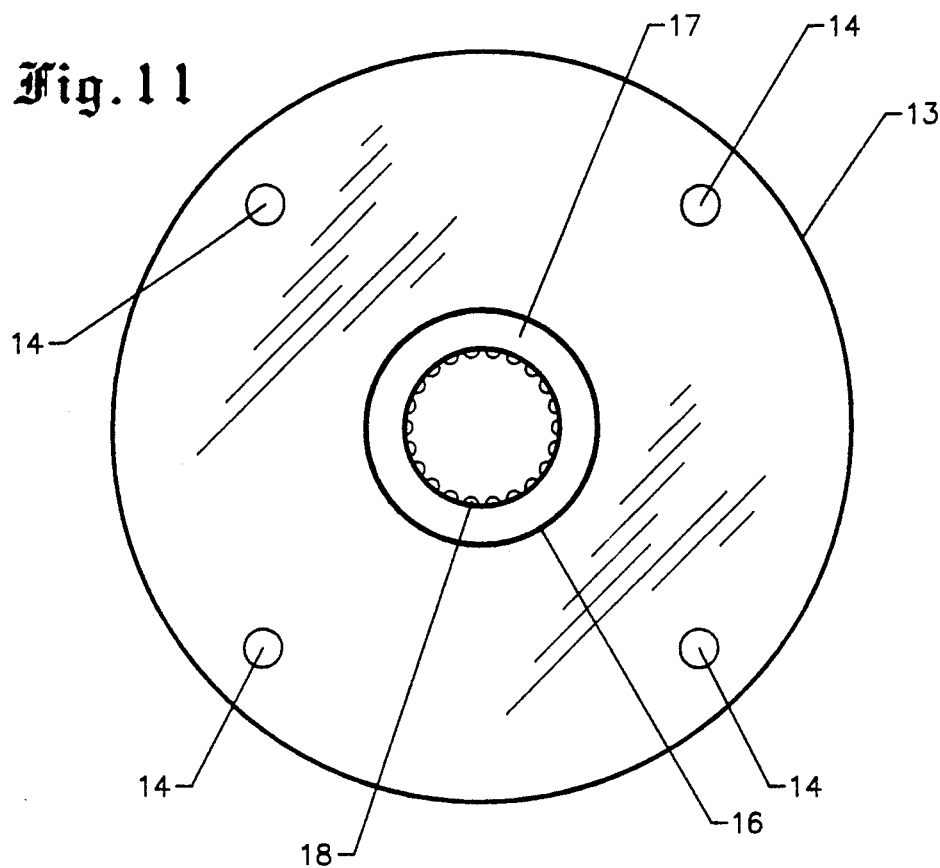
FIG. 11 is an elevation view of the right side of the wheel plate seen in FIG. 10.
Figure 12:
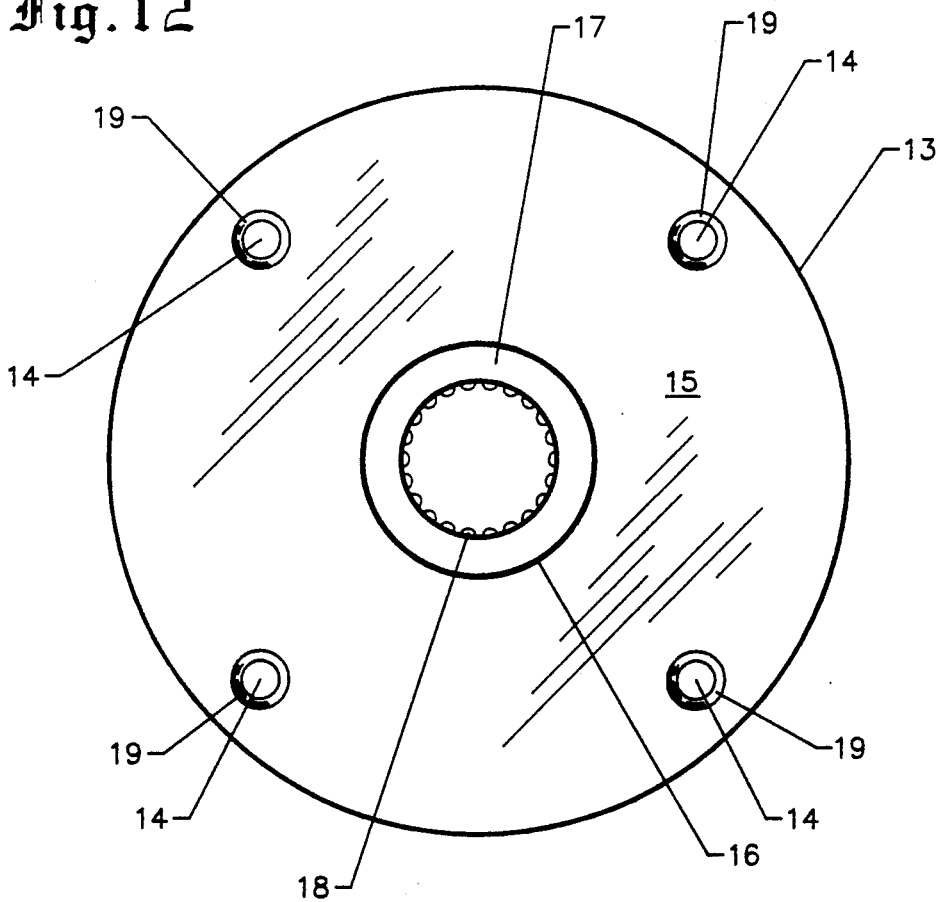
FIG. 12 is an elevation view of the left side of the wheel plate seen in FIG. 11.
Figure 13:
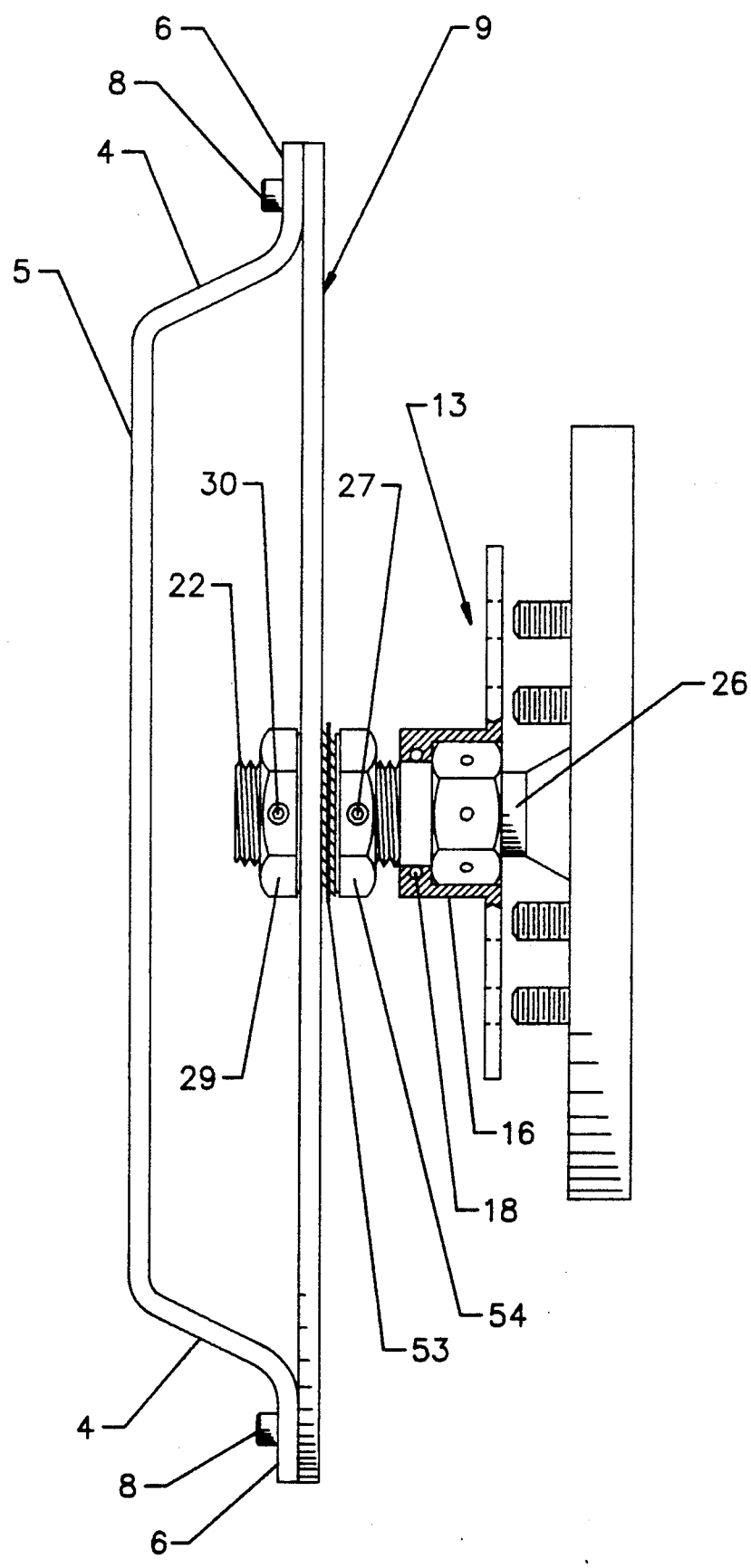
FIG. 13 is an elevation view in partial cross-section of the elements of the present invention with the cover mounted on the vehicle wheel.
Figure 14:
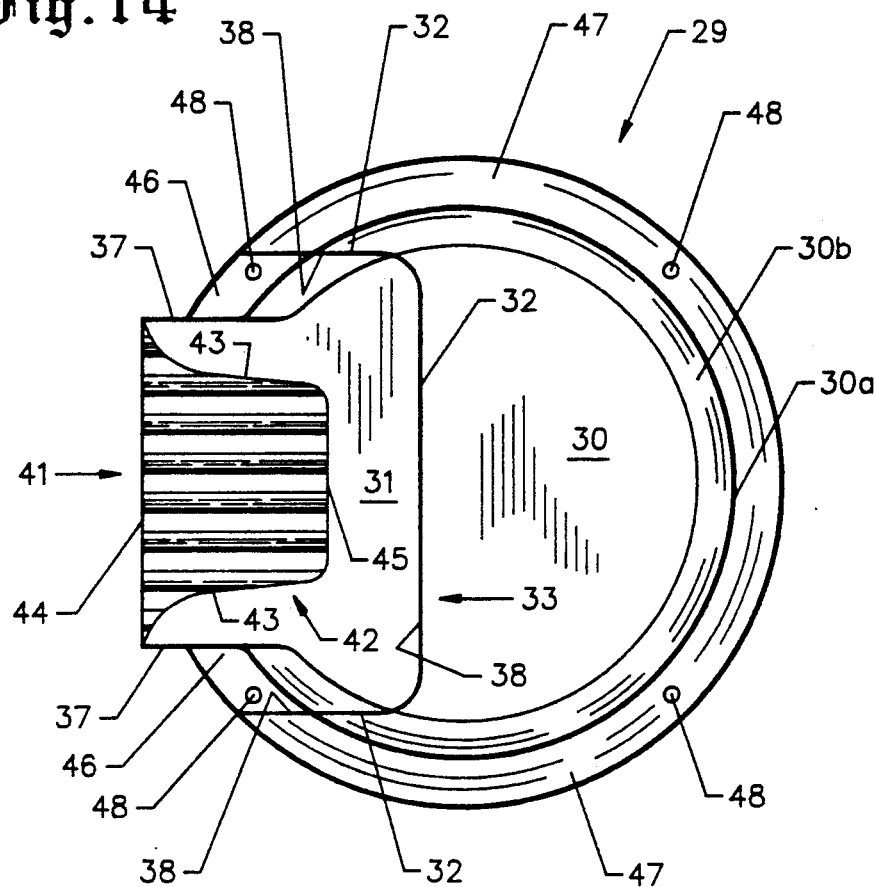
FIG. 14 is a top plan view of another embodiment of the present invention.
Figure 15:
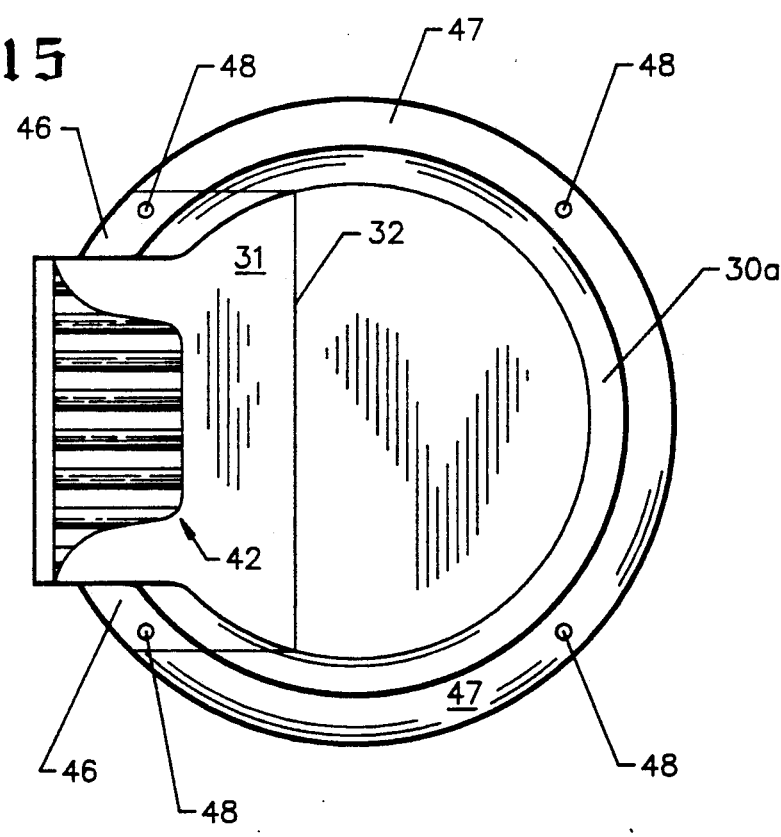
FIG. 15 is a bottom plan view of FIG. 14.
Figure 16:
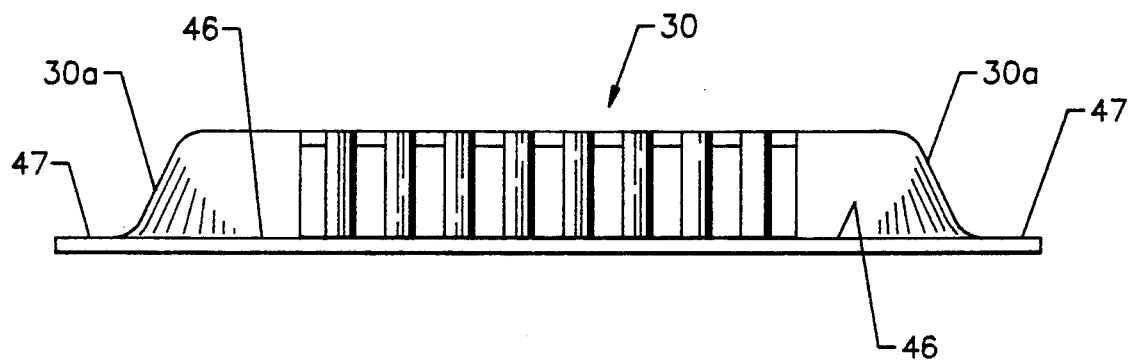
FIG. 16 is art elevation view of the left side of FIG. 14.
Figure 17:
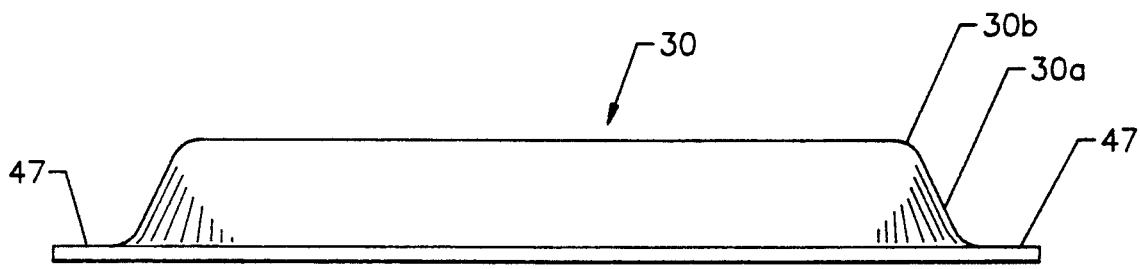
FIG. 17 is an elevation view of the opposite side of FIG. 14.
Figure 18:
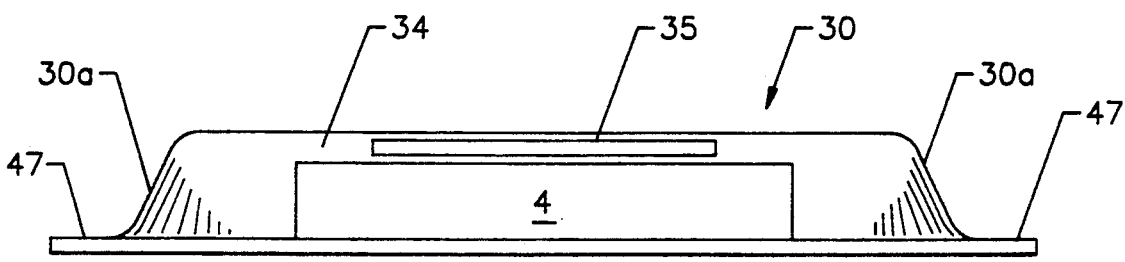
FIG. 18 is an end view in elevation of FIG. 16 with the air scoop portion removed.
Figure 19:
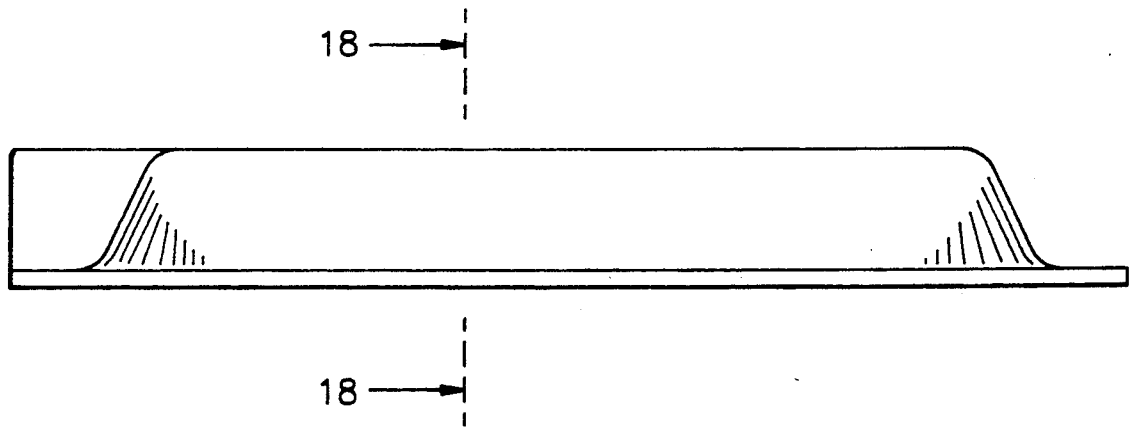
FIG. 19 is a side elevation view of FIG. 14, the view of the opposite side being substantially identical.
Figure 20:
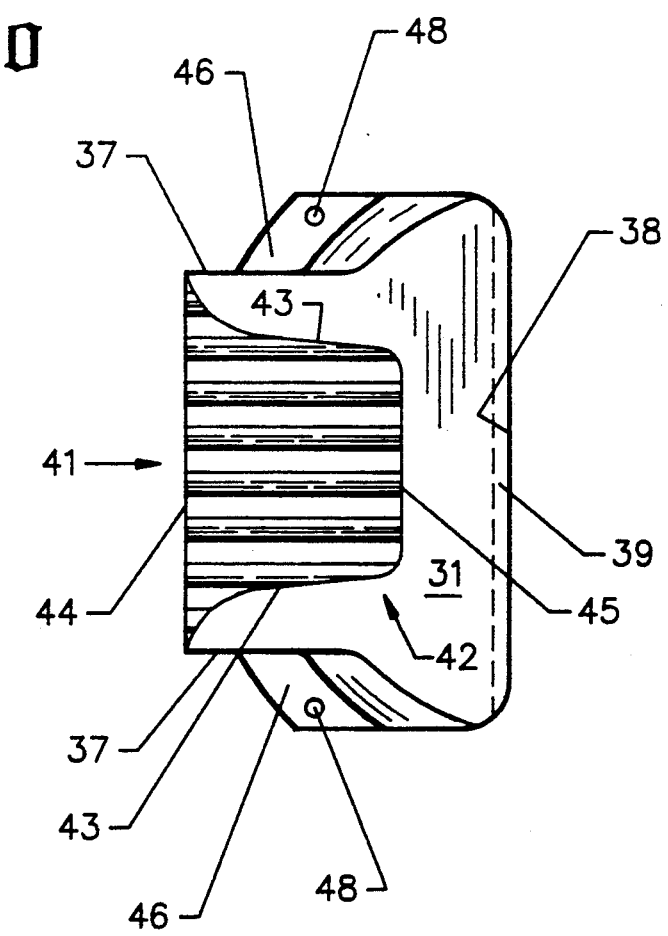
FIG. 20 is a top plan view of the air scoop portion shown in FIG. 14.

FIGS. 10-12 show the mounting accessories for the cover of the present invention which permit the cover to remain in a stationary position while the wheel upon which the cover is mounted rotates. The accessories comprise a wheel plate 13 having a plurality of openings 14 therethrough which correspond to the number of lug bolts on the wheel to which the plate will be attached. On one surface 15 of the wheel plate 13 is a bushing 16 which contains in its outer end 17 a bearing 18 which will permit rotation of the plate 13 without rotating the cover 1. The openings 14 in the plate 13 which receive the lug bolts have chamfered outer surfaces 19 substantially identical to the type which is found on the actual wheels of the vehicle to permit the installation of the conventional lug nuts (not a part of the invention) which hold the plate to the conventional vehicle wheel/brake drum. The bushing 16 carries a bore 19 which will be fitted over another element of the invention and will be subsequently described.

FIGS. 10-12 show the wheel cover extension shaft assembly 20 upon which the cover of the present invention will subsequently be mounted. The extension shaft assembly comprises a first exteriorly threaded member 22 having thereon an adapter bushing 21.

The adapter bushing 21 is hexagonal in shape and contains a plurality of opposed openings 23 therethrough, shaft 20 having a opening therethrough (not shown in the shaft) for reasons which will be described.

On the exterior surface 24 of the adapter bushing 21 is a bearing surface for the bearings 18 in the aforesaid wheel plate bushing 16. The one end 25 of the wheel mounting shaft is interiorly threaded to accommodate the threads on the shaft/spindle of the axle of the wheel upon which the present invention is to be mounted. Use is made of a jack-jamb bolt 27 which is threadedly fitted into the threaded interior of the end 28 of the wheel adapter shaft 20 in order to threadedly secure the wheel adapter shaft to the wheel spindle of the vehicle.

Referring now to FIGS. 14-23 it will be seen that this embodiment 29 comprises a rear air direction portion 30 and a separable air scoop portion 31. This embodiment provides means to repair the air scoop in the event of damage from road traffic such as debris from passing vehicles damaging the grill on the air scoop or to provide an air scoop which will permit an increased volume of air to flow into the wheel cover and be directed toward the wheel hub, break drum, and/or brake area. In this embodiment, the air direction cover 30 has a U-shaped opening 32 in the forward facing portion 33 thereof. The vertical face 34 of the opening in the wheel cover has a lip 35 formed along its periphery. The removable air scoop portion 31 has an external configuration on its sides 37 and interior edges 38 matching the U-shaped opening 32 in the wheel cover 30. Extending inwardly from the interior edge 38 is a channel 39 which mates with the lip 35 in the interior vertical face 34 of the wheel cover 30 when the air directing portion 30 and the removable air scoop portion 31 are assembled on the wheel cover mounting plate 9. The removable air scoop portion 31 has on its forward facing 41 an air intake 42 centrally positioned on the removable air scoop portion with an arcuate edge 43 extending from each side 37 of the air intake 42 to at least halfway to the interior rear edge 38 of said air scoop portion 31 as a U-shaped opening which carries a plurality of spaced apart bars 43 leading from the front edge 44 of said air scoop portion 31 to interior edge 45 of U-shaped opening 48. The front edge 44 of the removable air scoop portion 31 extends forward of the arcuate edges of this portion 31. The arms 33 of the U-shaped opening 45 flare outwardly on each side to the front edge 44 of the air scoop portion 31. Each side 37 of the air scoop 31 of this embodiment carries a flat rim 46 as a continuation of the rim portion 47 of the air directing portion 30. In each of these rims 46 and 47 there is an opening 48 which receives a screw or other securing means (not shown) such as a DZ4 bolt or any other adequate securing means to secure this embodiment.

Figure 21:
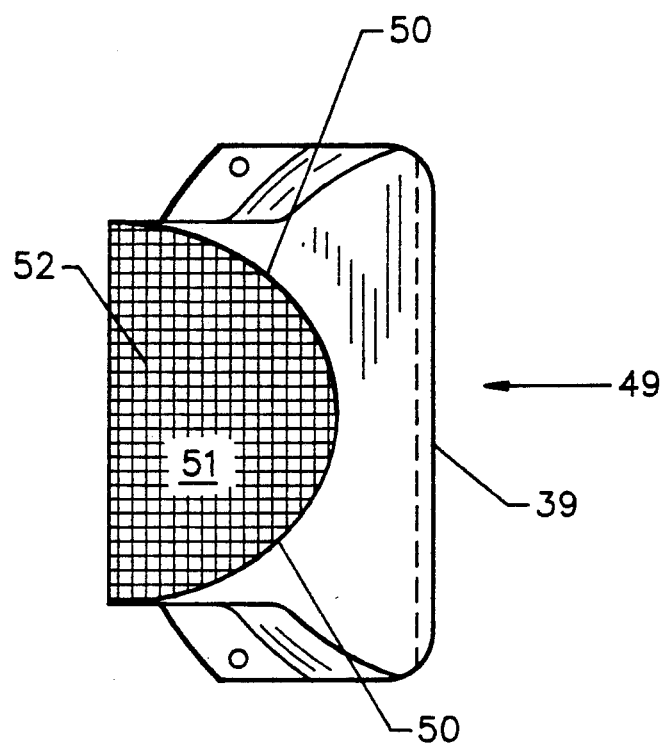
FIG. 21 is a top plan view of a modification of the air scoop portion of the embodiment seen in FIG. 14.
Figure 22:
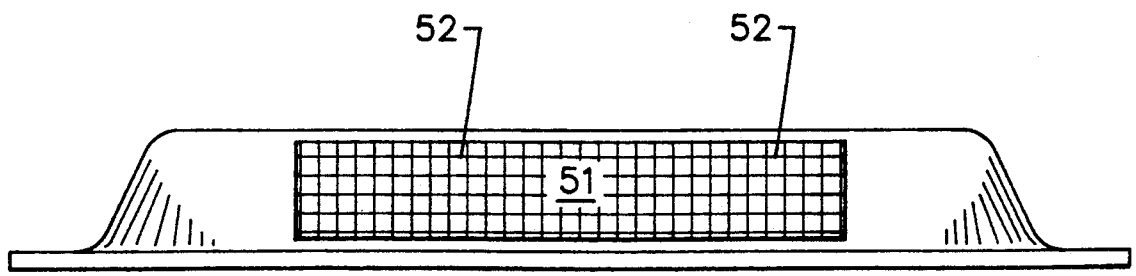
FIG. 22 is an elevation view of the left side of FIG. 21.

FIGS. 21-22 illustrates a modification of the air scoop portion 31. This embodiment has an inwardly extending dual arcuate form 50 forming an opening 51 which is protected from ingress of road debris or other flying objects by a screen or grid-like shield 52. The shield 52 may be formed integrally as a grid with the scoop portion 50 or of separate grids or screens of metal or thermoplastic material of suitable strength wherein such a separate shield may have tabs (not shown) which are secured to the undersurface of the air scoop portion 4. Such means for securing the grid-like shield 51 has the advantage of merely replacing the grid if it is damaged rather than replacing the entire air scoop portion.

The cover of the present invention is installed on the vehicle front wheel in the following manner. The conventional wheel lug nuts are removed, leaving the wheel in place. The dust cover cap for the wheel bearing is removed as is the cotter pin from the acastelated nut covering the wheel bearing for the wheel. These elements are conventional on all vehicles and are well known and thus are not shown in the drawing figures nor further described. The jack-jamb bolt 27 is inserted into the end 28 of adapter shaft 20. A grease seal is driven into the recess from which the spindle dust cover was removed. Adapter shaft 20 is threadedly moved along the wheel spindle until the adapter shaft 20 is pressed against the vehicle wheel spindle bearing and the cotter pin openings in the shaft and spindle are aligned. The cotter pin is inserted therein. The jack-jamb bolt is then tightened to further lock the adapter bushing 21 to the spindle. Plate 13 is then placed over the adapter shaft 20 and the bearings 18 therein are put into contact with the bearing surface 24 of the adapter bushing 21.

The lug nuts of the vehicle are then placed on the lug bolts of the wheel and then tightened to hold the adapter plate 13 in position. At this time the free rotation of the wheel plate 13 above the bearing surface 24 of the adapter bushing 21 should be checked. The first wheel adjuster nut 54 is then threaded upon the wheel adapter shaft 20 and star washer 53 placed on shaft 20. The wheel adapter plate 9 is then positioned on the shaft 20. The spacing of wheel adapter plate 9 from the rim/tire of the vehicle wheel is checked to ensure that there is at least an eighth of an inch clearance between the wheel rim and the wheel adapter plate. When this position has been established a set screw 27 in the first wheel adapter nut is then tightened. A locking plate 28 and second wheel adapter nut 29 is then inserted upon the wheel adapter shaft 20 against the adapter plate 9 to bring it into a secured position between the two nuts. A set screw 30 in the second adapter plate 29 nut is then tightened to hold that nut in position. The cover 1 of the present invention is then attached to the adapter plate 9 by means of screws 8 inserted through the peripheral openings 7 thereof as seen in the drawings and the corresponding peripheral openings 10 in the wheel adapter plate 9. Care must be taken to ensure the front opening of the cover is perpendicular and facing forward to receive the maximum flow of air through the grill.

Modifications or changes in the configurations of the wheel cover of the present invention as may occur to those of ordinary skill in this art or the design of the air scoop openings to meet different environmental conditions are considered to come within the scope of the appended claims.

What is claimed is:

1. A device mounted on a fixed axle of a wheel of a vehicle to divert air from the exterior of a wheel onto the interior of said wheel and across said wheel braking means during vehicle movement comprising: first means threadedly engaged with and secured to a non-rotating threaded spindle for said wheel, said spindle extending through said braking means and extending outwardly from said braking means, said braking means carrying on its outer surface a plurality of lug bolts for mounting said wheel; second means on said first means having bearing means on its outer surface, said second means further having a plurality of openings in its periphery to receive means to lock said first means to said spindle; third means for mounting a cover assembly thereon in non-rotating relationship with said wheel having a central opening therein for emplacement of said third means around said first means as it extends outward of said second means, said third means including elements to adjustably position said third means on said first means spaced from the outer surface of said wheel rim; and a fourth means secured to said third means outer surface to receive air from said movement of said vehicle and to divert said air onto said braking means.

2. The device according to claim 1 wherein said first means comprises a hollow cylindrical shaft having a threaded outer surface and a threaded interior surface, one end of said threaded interior surface engaging said threaded wheel spindle, said one end having a diametral passageway therethrough to align with a passageway in said spindle when said one end is properly positioned on said spindle to permit the insertion of a cotter pin through said aligned passageway and a threaded jack-jam bolt threadedly inserted into said other end of said shaft to draw said shaft down on said spindle.

3. A device according to claim 1 wherein said second means comprises a bushing with a bearing surface, said bushing extending outwardly of said spindle and a grease and dust seal positioned around said spindle between said bushing and a shoulder on said braking means outer surface.

4. A device according to claim 1 wherein said third means comprises a circular wheel plate having a central opening therethrough and a boss formed on one side of said plate, the outer portion of said boss having bearing means positioned therein to rest on a bearing surface of said second means, said boss being of a diameter such that said opening will encompass said second means when said third means is installed.

5. A device according to claim 1 wherein said fourth means comprises a circular mounting plate for said cover means and has a central opening which fits over said first means and a pair of flat hexagonal nuts, one to be installed over said first means on each side of said plate, to adjustably position said mounting plate on said first means so that said mounting plate is spaced from the periphery of said wheel rim and a plurality of openings on said plate periphery to receive means to secure said cover assembly to said plate.

6. A device according to claim 1 wherein said cover assembly comprises a domed wheel cover which is circular over the major portion of its periphery, said cover having a substantially rectilinear outwardly extending air intake portion which rear segment of said portion is faired into said circular periphery, said assembly further having an outwardly extending rim therearound except under the air intake portion, said rim having a plurality of openings therethrough for alignment with openings in said fourth means for securing said cover assembly to said fourth means.

7. The device according to claim 6 wherein said domed wheel cover has a U-shaped recess in one portion of said cover and said air intake portion is separable from said cover assembly and has an outer configuration matching the U-shaped recess in said domed cover portion, said U-shaped recess in said cover portion having a channel formed in its periphery to receive an outwardly extending lip formed on the periphery of said air intake portion configuration.

* * * * *